June 4, 1957  R. B. WIDTH  2,794,900
WATER COOLED ELECTRIC WELDING ASSEMBLY
Filed Aug. 11, 1954  2 Sheets-Sheet 1
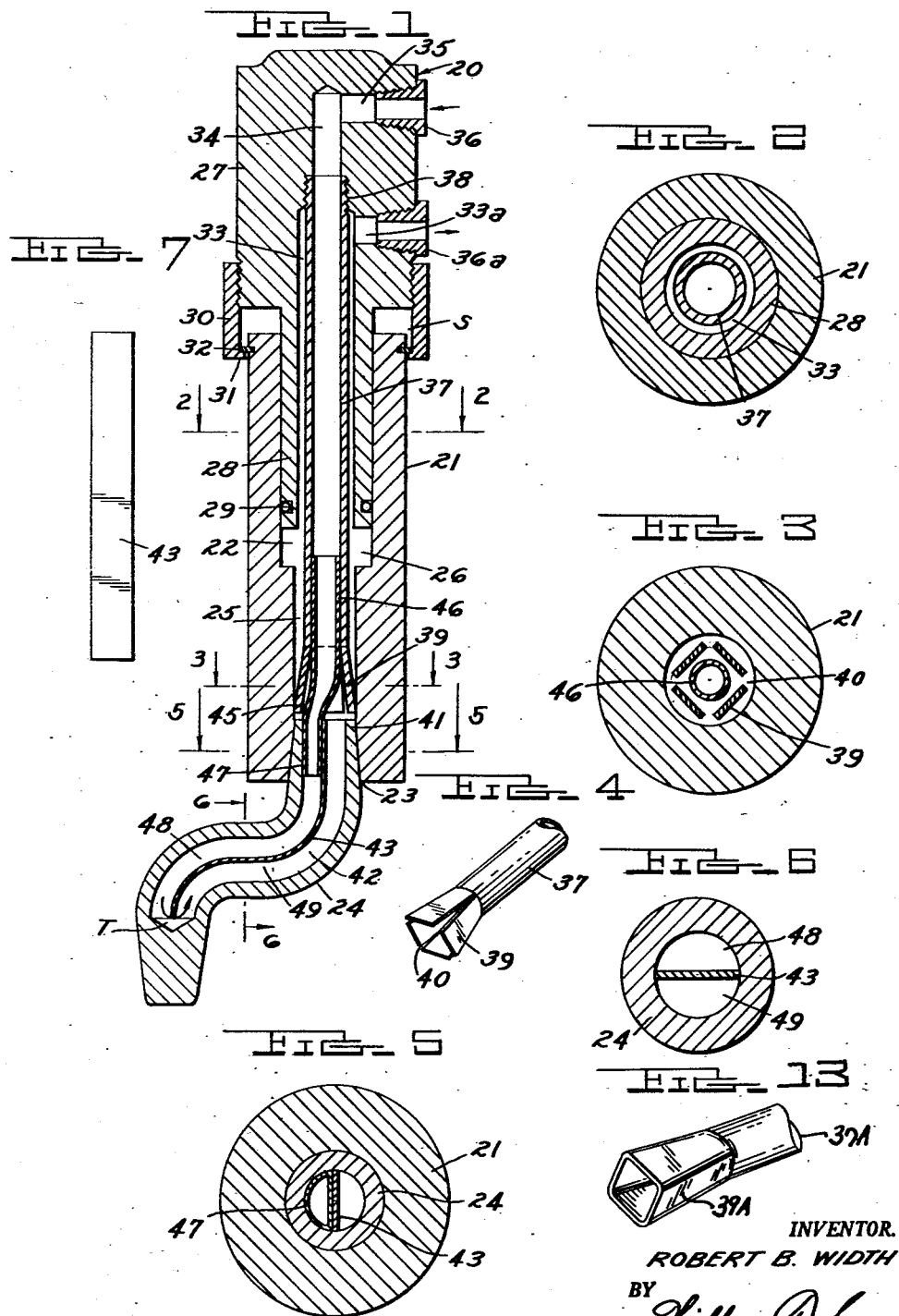
INVENTOR.
ROBERT B. WIDTH
BY
ATTORNEY

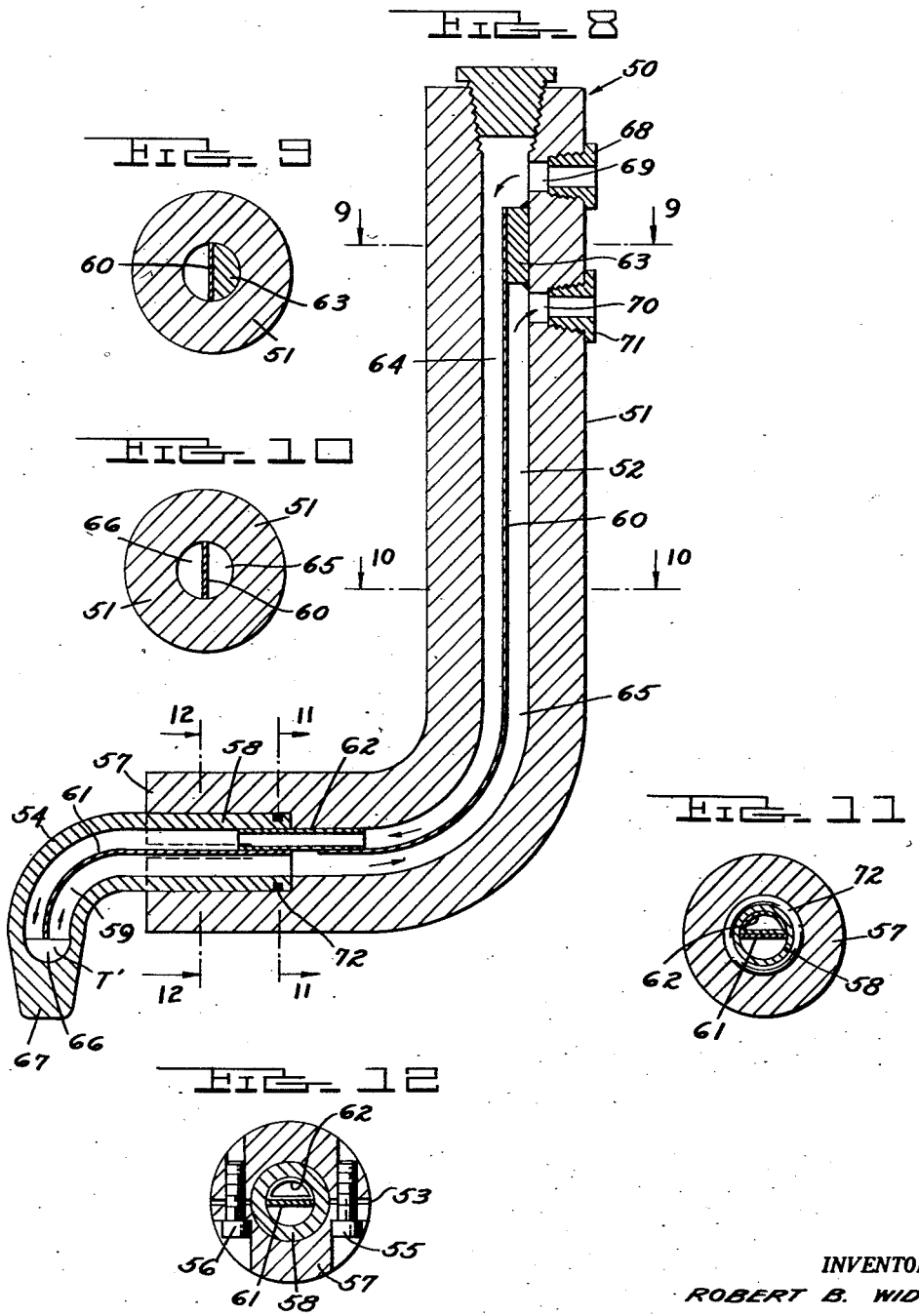

United States Patent Office 2,794,900
Patented June 4, 1957

2,794,900
WATER COOLED ELECTRIC WELDING ASSEMBLY

Robert B. Width, Detroit, Mich., assignor to Welding Sales & Engineering Co., Detroit, Mich., a corporation of Michigan Application August 11, 1954, Serial No. 449,148

1 Claim. (Cl. 219—120)

This invention relates to electric welding electrodes and holders therefor and in particular to water-cooled electrode holders and water-cooled electrode tips having new, novel, and inventive channelling means for circulating the water past the tip-end and means for ejecting the tips upon their being consumed or deformed by the welding process.

Electric water-cooled electrode welding holders and hollow electrode tips therefor have been employed heretofore to facilitate circulating the water to the electrode tip. In many instances, it is necessary to off-set or bend the electrode and the holder to enable the tip to enter recesses which the device otherwise could not enter and means have been employed heretofore for ejecting the tip from the holder upon it's being consumed; however, the several devices of the prior art have not proven entirely satisfactory inasmuch as they are complicated in design and construction, expensive to manufacture, difficult to use, and inefficient in operation.

With the foregoing in view, the primary object of the invention is to provide a welding-tip holder-assembly in conjunction with straight or reversely bent hollow tips which is simple in design and construction, inexpensive to manufacture, easy to use, easy to remove the tips without damage and in a quick manner, and which provides full-flow channels without narrowing portions to the very end of the tip.

An object of the invention is to provide a welding holder and tip having channels and ejectors therefor which can be more economically manufactured as the component parts are easily made and the assembly of the parts readily accomplished.

An object of the invention is to provide a welding tip and welding holder with circulatory channels therefor including channel members which can be installed, used, and operated with ease by either an experienced or an inexperienced operator.

An object of the invention is to provide a welding tip and holder and channel members for the circulatory system for cooling them which can be fitted to any size adapter or tip without changes in the assembly or arrangement of parts.

An object of the invention is to provide a combined cooling fluid channel and knock-out tube.

An object of the invention is to provide a much simplified electrode holder and tip and cooling fluid channel member which is simple and inexpensive to manufacture, maintain, and repair.

An object of the invention is to provide a flexible, flat channel divider member strip which is substantially equal in width to the diameter of the hole in the hollow tip or the holder member which when forced into the holder member or hollowed tip will follow the bend contours on a diameter thereby centering the divider strip relative to the aperture or channel in the holder or tip so as to establish channels of equal cross-section and flow capacity regardless of bends and turns.

An object of the invention is to provide a connecting member which channels flow from a water injecting tube to the divider strip channel.

An object of the invention is to provide a movable combined water channelling and knock-out tube which has a flared end for bypassing reversely flowing water.

An object of the invention is to provide a connector for connecting two divider strips at their joints so as to insure the uninterrupted properly channelled flow of cooling fluid past the junction of the dividing strips.

These and other objects of the invention will be apparent by reference to the following description of a water-cooled electrode holder and tip therefor incorporating the novel channelling and knock-out means embodying the invention taken in connection with the accompanying drawing in which:

Fig. 1 is a cross-sectional view of the inventive water-cooled electrode holder and tip incorporating the novel knock-out, channelling and connector means.

Fig. 2 is a cross-sectional view of Fig. 1 taken on the line 2—2 thereof.

Fig. 3 is a cross-sectional view of Fig. 1 taken on the line 3—3 thereof.

Fig. 4 is a perspective view of the end portion of the lanced inventive combined knock-out and channelling device or tube.

Fig. 5 is a cross-sectional view of Fig. 1 taken on the line 5—5 thereof.

Fig. 6 is a cross-sectional view of Fig. 1 taken on the line 6—6 thereof.

Fig. 7 is a plan view of the flexible channel divider strip.

Fig. 8 is a cross-sectional view of a water cooled electrode and tip therefor incorporating the novel channelling and connector means.

Fig. 9 is a cross-sectional view of Fig. 8 taken on the line 9—9 thereof.

Fig. 10 is a cross-sectional view of Fig. 8 taken on the line 10—10 thereof.

Fig. 11 is a cross-sectional view of Fig. 8 taken on the line 11—11 thereof.

Fig. 12 is a cross-sectional view of Fig. 8 taken on the line 12—12 thereof; and Fig. 13 is a view similar to Fig. 4 showing a modified combined knock-out and channelling device or tube.

Referring now to the drawings wherein like numerals refer to like and corresponding parts throughout the several views, the inventive electrode holders, tips, connector, and channelling means disclosed therein to illustrate the invention comprises an electrode holder and tip assembly 20, Fig. 1, and an electrode holder and tip assembly 50, Fig. 8, which embody the inventive channelling means and connectors therefor and it is to be noted that the assembly 20 incorporates the inventive combination knock-out and channelling tube.

More particularly, referring to Figs. 1–7 and 13, the inventive holder and tip assembly comprises a barrel 21 which is adapted to be clamped in the welding machine, not shown, and which is provided with an interior bore 22 having a tapered portion 23 at the lower end thereof for receiving the shank of the reversely bent tip 24 or a straight tip, not shown, and a bore 25 leading from the tapered bore 23 to the larger cylindrical bore 26. The head 27 is spaced, as by the space S, above the barrel 21 and the nipple portion 28 of the head 27 is slidably received in the enlarged bore 26 of the barrel 21 and the O-ring 29 is disposed sealably between the side walls of the respective parts. The collar 30 is threaded on the head 27 and has a lip portion 31 for engaging the snap-ring 32 on the barrel portion 21 so as to prevent the head from being removed from the barrel portions such as by the pressure of the water or cooling fluid channelled in the conduits. The head 27 and nipple portion 28 are equipped with an internal bore 33 which is substantially of the same diameter as the barrel bore 25, an interconnecting bore portion 34, and a transverse bore portion 35 for connection of the fluid or water connecting fittings 36. The combined fluid flow conduit and knock-out tube 37 or 37A is threaded in the head 27 as at 38 and is equipped with a flared opposite end 39 or 39A having side wall lanced portions 40. The knock-out conduit tube 37 or 37A is disposed between the head 27 and the welding tip 24 so that when a hammer blow is effected on the top of the head 27, the head 27 and the tube 37 or 37A will travel downwardly with the flared end 39 or 39A contacting the end 41 of the tip so as to drive the tip out of the holder barrel 27.

The reversely bent welding tip 24 is equipped with a hollow bore 42 which is divided into two equal channels by the flexible strip channel divider strip 43 which has a width dimension substantially equal to the diameter of the hollow bore 42. The conduit adapter 45 has a cylindrical end 46 sealably, slidably interfitting interior of the knock-out conduit tube 37 or 37A and a half-moon end portion 47 adapted to sealably interfit between the side wall of the tip bore 42 and the divider strip 43.

The flow of water or of the cooling fluid in the device described is through the bores 34, 35, the conduit tube 37 or 37A, adapter tube 46, channel 49 of the tip as divided by the divider strip 43 to the end of the tip 24, and then back through the channel 49 of the tip 24 as set up by the divider strip 43 in the bore 42, then past the space S-1, then between the sides 39 or 39A and the sides of the bore 25 into the bore 25, and, in the instance of the lanced sides 39 also and through the lanced portions 40 of the conduit tube 37, through the holder barrel interior bore 25, the head and nipple bore 33 to the transverse bore 33A, the hose fitting 36A, and then to disposal.

Referring now to the holder and tip assembly of Figs. 8-12, it will be noted that the device includes an off-set barrel portion 51 which is adapted to be clamped in the welding machine, not shown, which has an axial bore 52 and a radial slit 53 at the end 57 for clamping the shank of the off-set welding tip 54 in the holder 51 such as by the screws or bolts 55 and 56. The tip end 57 of the holder 51 is equipped with an enlarged bore communicating with the axial bore 52 for receiving the shank 58 of the tip 54 therein so that the internal bore 59 of the tip 54 interconnects with the axial bore 52 of the holder 51.

Disposed in the barrel axial bore 52 is the flexible divider strip 60 and disposed in the tip bore 59 is the flexible divider strip 61 and disposed in the tip bore 59 is the flexible divider strip 61. These strips 60 and 61 have a width dimension substantially equal to the diameter of the bores 52 and 59 so that they axially or diametrically locate themselves in the center of the bore regardless of the bends in the holder or in the tip. A water connector or coupling member 62, half-moon shape in cross section, is disposed at the one side of the strips 60 and 61 so as to bypass the break or separation therebetween. The opposite end of the holder, as seen at the top of the device as viewed in the drawing is the half-moon plug 63 disposed on one side of the divider strip 60 so as to separate the channels at the top as formed by the divider strip 60.

The divider strips 60 and 61, the coupling 62, and the water plug 63 divide the axial bores 52 and 59 of the holder and tip respectively into an intake channel 64 and on one side of the divider strips and an outlet channel 65 on the other side of the divider strips which channels interconnect at 66 immediately adjacent the contact end 67 of the welding tip 54. Cooling fluid or water is introduced to the channels via the hose coupling 68 and transverse channel 69 into channel 64 and the flow from channel 65 is emitted through transverse bore 70 and hose coupling 71. It can now be seen that water introduced via the coupling 68 travels through the holder past the end contact portion 67 of the tip 54 and then out channel 65 to disposal.

It will be noted that the inventive flexible divider strips 43, 60, and 61 are flexible lengthwise but relatively inflexible widthwise due to the fact that their length is sufficient to lend flexibility and their width is too short to lend flexibility. To insert the divider strips 43, 60, and 61 in their respective holders and/or tips, it is only necessary to take the strip, such as strip 43, Figs. 1 and 7, and push same into the bore of the reversely bent tip 24 and due to the fact that the strip 43 is flexible lengthwise, and of a width dimension substantially equal to the diameter of the bore 42, the strip 43 self-positions itself on a diameter of the bore regardless of the reverse turns in the electrode, and upon the user forcing the strip into the bore, the strip automatically positions itself across and on the axis of the bore thereby dividing the bore into two equal channels on either side thereof and it is obvious that the tapers T and T' at the end of the tips 24 and 54 diminish the cross sectional diameter of the bore thereby preventing the divider strip from going to the bottom of the bore so that the end of the strip is properly spaced above the blind end of the bore to insure continued flow past the end of the tip. In other words, the strip will not go to the bottom of the bore, the user can force the strip in until the tapered T or T' stops further insertion of the divider strip. It is obvious that coupling adapters 45, coupling 62, and block 63 can be used with the inventive device or any similar device to develop the similar channels as taught by the invention.

Considering the operation of the device shown in Figs. 1-7, the user or operator raises the head 27 until the limit is reached between the collar 30 and the snap ring 32 and then inserts the tip 24 in position. Upon the tip being consumed through use, the operator hits the top of the head 27 with a hammer causing the head 27 and collar 30, and nipple portion 28 to move downwardly carrying knock-out and conduit tube 37 therewith to drive the flared end 39 or 39A of the tube against the internal end 41 of the tip so as to eject the tip 24 from the barrel 21. The operator then raises the head 27 and inserts a new tip insuring that the half-moon connector portion 47 of the adapter 45 is in the proper channel of the tip as divided by the divider strip 33. The device is then ready for repeated operation. Considering the operation of the device shown in Figs. 8-12, it appears that it is only necessary for the holder to loosen the bolts 55 and 56 and due to the fact that there is no tapered jam-fit between the electrode 54 and the holder end 57, that the tip 54 will be readily removable.

The holders, tips, divider strips, coupling members, and combined knock-out and conduit tube shown to illustrate the invention constitutes a compact, durable, neat and efficient mechanism easily operated to rapidly remove and insert the tips and for establishing the desired circulatory channels thereby preventing the loss of valuable down time. Although but two embodiments of the invention have been shown and described in detail, it is obvious that many changes may be made in the size, shape, detail, and arrangements of the various elements of the invention within the scope of the appended claim.

I claim:

A water cooled electric welding electrode assembly comprising a hollow barrel adapted to be held in a welding machine having interior side walls defining a barrel channel, a hollow tip at one end of said barrel having interior side walls defining a blind end tip channel communicating with said barrel channel, an axially movable hollow head on said barrel having interior side walls defining a head channel, a sleeve nipple on said head slidably disposed in said barrel, a tube carried by said head disposed in said head, sleeve nipple, and barrel channels to a point adjacent said tip in spaced relation to the interior side walls of said head, sleeve nipple, and barrel, so as to define a channel therebetween, an angularly flared end on said tube adjacent said tip end and adapted to contact said tip end upon movement of said head, a flexible divider strip dividing the said tip channel into two channels intercommunicating at the blind end thereof, a channel adapter slidably interconnecting the interior of said tube and one of said tip channels so as to carry flow from said tube interior past said tube flared end area to said tip end; the flow from said tip end being channelled from said tip other channel via said tube flared end to the channel defined by said barrel, nipple, and head interior and said tube exterior; said tube being adapted to move axially with said head to contact and eject said tip from said barrel.

References Cited in the file of this patent

UNITED STATES PATENTS

| | | |
|---|---|---|
| 2,134,110 | Eckman | Oct. 25, 1938 |
| 2,179,326 | Eckman | Nov. 7, 1939 |
| 2,374,979 | Carlson | May 1, 1945 |
| 2,443,966 | Seeloff | June 22, 1948 |
| 2,489,993 | Wood | Nov. 29, 1949 |